United States Patent [19]

Sumida

[11] 4,119,899
[45] Oct. 10, 1978

[54] MOTOR CONTROL MEANS FOR POWER DRIVEN WINDOW

[75] Inventor: Shizuo Sumida, Hiroshima, Japan

[73] Assignee: Toyo Kogyo Co., Ltd., Japan

[21] Appl. No.: 802,582

[22] Filed: Jun. 1, 1977

[30] Foreign Application Priority Data

Jun. 2, 1976 [JP] Japan .............................. 51-71903[U]
Jun. 11, 1976 [JP] Japan .............................. 51-76539[U]

[51] Int. Cl.² .............................................. G05B 1/00
[52] U.S. Cl. .................................... 318/459; 318/331; 318/469
[58] Field of Search ............... 318/459, 331, 469, 368, 318/394, ; 361/33

[56] References Cited

U.S. PATENT DOCUMENTS

| 3,231,806 | 1/1966 | Schmedel ............................. 318/469 |
| 3,950,675 | 4/1976 | Weber et al. ......................... 361/33 |
| 4,040,117 | 8/1977 | Houser ................................... 361/33 |
| 4,048,662 | 9/1977 | Burguburu .......................... 318/469 |

Primary Examiner—David Smith, Jr.
Attorney, Agent, or Firm—Fleit & Jacobson

[57] ABSTRACT

A motor control means for power driven window including an reversible D.C. motor having first and second brushes and a third grounded brush. The motor control means also has a first switch for selectively supplying a D.C. power to one of the first and second brush to drive the motor. A solenoid is provided to be energized by a counter electromotive voltage induced between the first and second brushes during rotation of the motor. When the solenoid is energized, the solenoid acts to hold a second switch in a closed condition so as to maintain supply of the driving power to the motor.

6 Claims, 16 Drawing Figures

MOTOR CONTROL MEANS FOR POWER DRIVEN WINDOW

This invention relates to motor control means for power driven windows for use in automobiles and the like.

Heretofore, various types of motor control means for power driven windows have been known. Many of the conventional motor control means have been constructed such that once a motor circuit is closed, the motor circuit is maintained in a closed condition until a window glass driven by the motor is fully extended or completely retracted. For this purpose, the conventional motor control means ordinarily have means for detecting stop of the motor to open a contact of a hold relay provided in the motor circuit, so as to complete a full open operation and a complete close operation of the window. One of the conventional detecting means has included a reed switch provided in an armature of the window driving motor and a circuit for detecting ON and OFF of the reed switch. In any case, the conventional motor control means have comprised a special auxiliary circuit for deenergizing the motor, in addition to the hold relay for maintaining the motor circuit in an operating condition. Therefore, the conventional motor control means have been complicated as a whole.

Accordingly, an object of this invention is to provide a new and improved motor control means for power driven windows which eliminates the above mentioned defects.

Another object of this invention is to provide a new and improved motor control means for power driven windows without needing any special circuit for deenergizing the window driving motor.

According to this invention, the above objects of this invention are attained by a motor control means for power driven windows which comprises a D.C. motor having an armature, a grounded brush and first and second driving brushes; a switch means for applying a driving voltage to one of the first and second brushes; a solenoid means adapted to be energized by a counter electromotive voltage appearing between the first and second brushes when the motor is rotating; a relay contact means bypassing the switch means and adapted to be closed by the energized solenoid to applying the driving voltage to the motor. Even if the switch means is opened, the relay contact means is held in the closed condition by the energized solenoid, whereby the full open or complete close operation is continued. Then, when the open or close operation is completed, the motor is stopped because of overload, resulting in no induction of the counter electromotive voltage. As a result, the solenoid is deenergized to open the relay contact means to thereby deenergize the motor.

According to one preferable mode of this invention, the switch means, the relay contact means and the solenoid are contained in one operation switch which comprises one operating knob adapted to close the switch means when the operating knob is in a first position and to close the switch means and the relay contact means, when the operating knob is in a second position. Once the knob is brought into the second position, the switch means and the relay contact means are maintained in the closed condition by the energized solenoid.

The above and other objects and effects of this invention will become apparent from the following detailed description of preferred embodiments of this invention taking reference to the accompanying drawings, in which:

Figures 1, 2, 3:
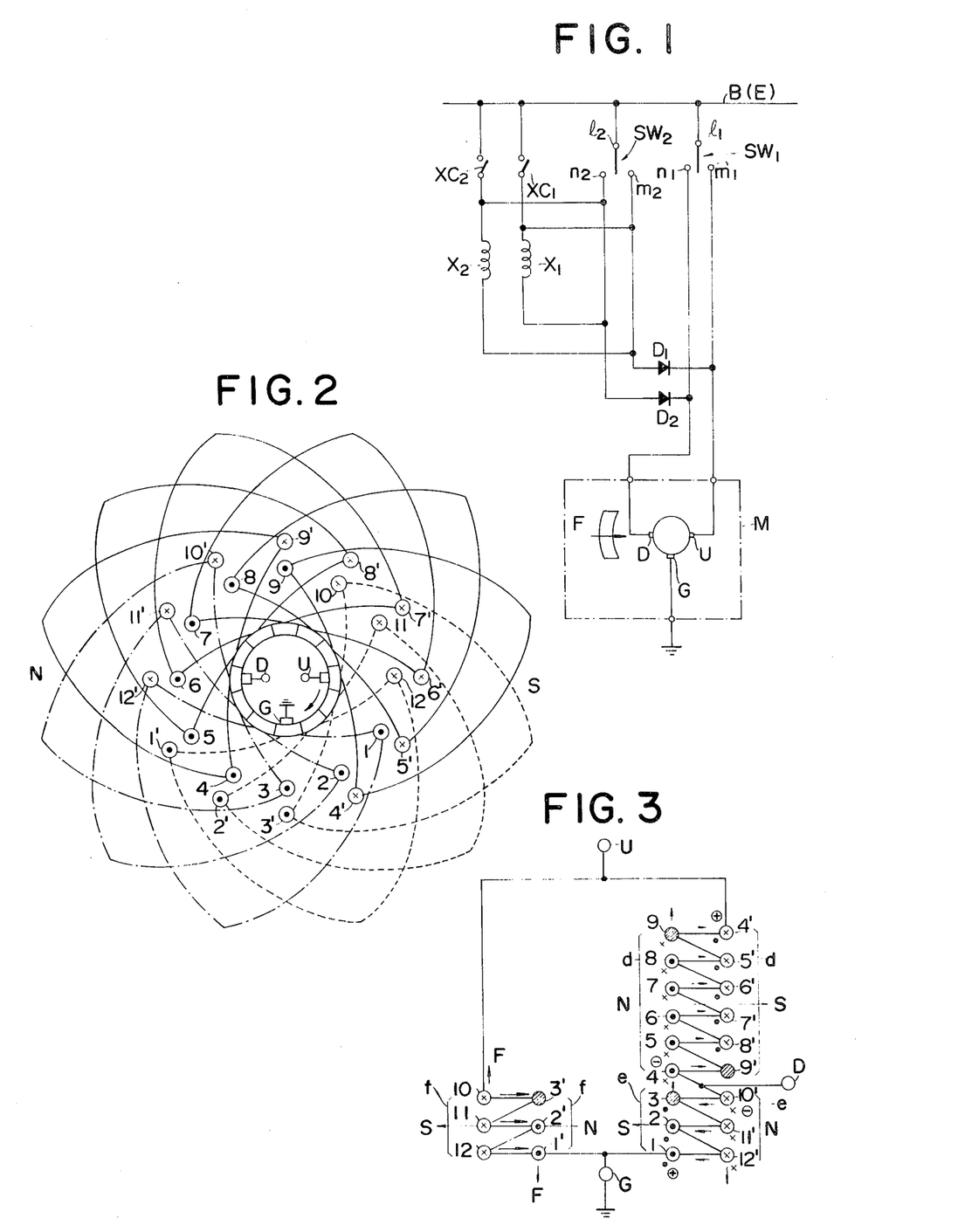
FIG. 1 is a circuit diagram of a first embodiment of the motor control means according to this invention.
FIG. 2 shows the connection relation between armature windings and commutator segments of the D.C. motor used in the motor control means shown in FIG. 2.
FIG. 3 is a diagram of the armature windings showing the driving current direction and the counter electromotive current direction in each armature winding.

Referring to FIG. 1, there is shown a circuit diagram of a first embodiment of the motor control means for power driven windows according to this invention. A window driving motor M is a D.C. motor which has a brush U for forward direction, a brush D for reverse direction and a grounded brush G. The motor M also has a permanent magnet which generates a stationary magnetic field F. The motor M is such that selective energization of the forward brush U and the reverse brush D will change the direction of the magnetic field occurring in the armature of the motor, to thereby rotate the motor in a forward direction or in a reverse direction.

In this connection, the forward brush U of the motor M is connected to a first stationary contact $m_1$ of a first operation switch $SW_1$ whose a wiper contact $l_1$ is connected to a power source B and biased to be normally in a neutral position as shown. A second stationary contact $n_1$ of the switch $SW_1$ is connected to the reverse brush D. Thus, if the switch $SW_1$ is actuated to bring the wiper contact $l_1$ into contact with the first contact $m_1$, the window driving motor M is rotated forwardly to raise a window glass (not shown), namely to close the window. By the deactuation of the switch $SW_1$, the motor is deenergized to stop the close operation of the window glass. On the other hand, if the wiper contact $l_1$ is brought into contact with the second contact $n_1$, the motor M is rotated reversely to lower the window glass, i.e., to open the window.

The motor control circuit has another operation switch $SW_2$ for full open and complete close operation of the window glass. This second operation switch $SW_2$ has a wiper contact $l_2$ connected to the power source B and biased to be normally in a neutral position as shown. The switch $SW_2$ also has a first stationary contact $m_2$ connected through a diode $D_1$ to the forward brush U of the motor M and a second stationary contact $n_2$ connected through a diode $D_2$ to the reverse brush D of the motor M.

Further, the motor control circuit has a forward rotation hold circuit consisting of a solenoid $X_1$ connected between the stationary contact $m_2$ of the switch $SW_2$ and the anode of the diode $D_2$ and a relay contact $XC_1$ adapted to be closed by energized solenoid $X_1$ and connected between the power source B and the stationary contact $m_2$ of the switch $SW_2$ to bypass the switch $SW_2$. A reverse rotation hold circuit provided in the motor control circuit consists of a solenoid $X_2$ connected between the stationary contact $n_2$ of the switch $SW_2$ and the anode of the diode $D_1$ and a relay contact $XC_2$ adapted to be closed by energized solenoid $X_2$ and connected between the power source B and the stationary contact $n_2$ of the switch $SW_2$. Therefore, closure of the relay contact $XC_1$ will complete a closed circuit for rotating the motor M in the forward direction, while closure of the relay contact $XC_2$ will complete a closed circuit for the reverse rotation of the motor M.

As shown in FIG. 2, the window driving motor M may comprise an armature having twelve slots and windings 1 through 12 and 1' through 12' located in these slots and connected to respective commutator segments as shown by the solid lines, the dotted lines and the single-dotted chain lines to constitute a lap winding armature. The forward brush U and the reverse brush D are located at diametrically opposed sides of the commutator. The ground brush G is located to have 90° from the forward brush U and the reverse brush D, respectively.

Now, assuming that the commutator is positioned in relation to the three brushes U, D and G as shown in FIG. 2, the armature winding $d$ between the brushes U and D includes the windings 4 through 9 and 4' through 9' connected as shown by the solid lines. Furthermore, the armature winding $e$ between the brushes D and G includes the windings 1 through 3 and 10' through 12' connected as shown by the chain lines and the armature winding $f$ between the brushes U and G includes the windings 10 through 12 and 1' through 3' connected as shown by the dotted lines. The armature winding $d$ has the number of turns twice that of each of the armature windings $e$ and $f$. If a voltage is applied to the brush U, the current flows through the respective windings 1 through 12 and 1' through 12' in the respective directions shown in FIG. 3, to rotate the armature in the forward direction shown by the arrow in FIG. 2. At this time, the respective windings traverse the stationary field shown by N and S in FIG. 2, so that a counter electromotive force occurs in each winding.

On the one hand, if a voltage is applied to the brush D, the current flows through the respective windings in the directions opposite to those shown in FIG. 2 to rotate the armature in the reverse direction.

Figure 4A:
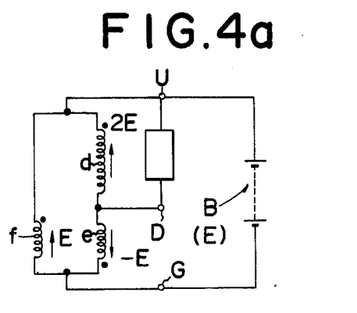
FIG. 4a is an equivalent circuit of that shown in FIG. 3 when the motor is rotating.

Explanation will now be made on operation of the motor control means for power windows as mentioned above. If the second switch $SW_2$ is actuated to contact its wiper contact $l_2$ with its first stationary contact $m_2$, a voltage E is applied from the power source B to the forward brush U of the motor M. As a result, the motor is rotated in the forward direction to raise the window glass. At this time, a counter electromotive force is induced in each winding each time the winding traverses the stationary field. FIG. 3 shows the distribution of the windings across the power source, the direction of the driving current and the direction of a counter electromotive current. In FIG. 3, a mark given in each of the circles which show the respective windings 1 to 12 and 1' to 12' indicates the direction of the driving current flowing through that winding. A mark given below each of the circles showing the winding indicates the direction of the counter electromotive current flowing through that winding. As seen from FIG. 3, the counter electromotive current flowing through the armature winding $d$ is opposite to that flowing through the armature winding $e$ and the same as that flowing through the armature winding $f$. Since the armature winding $d$ has the number of turns twice that of each of the armature windings $e$ and $f$, the counter electromotive voltage appearing across the armature winding $d$ is twice that appearing across each of the armature windings $e$ and $f$. Therefore, as seen from FIG. 4a showing an equivalent circuit of the armature winding circuit, a voltage E from the power source B is applied across the series connection of the armature windings $d$ and $e$ and across the armature winding $f$, while a counter electromotive voltage E appear across the armature winding $f$ and across the series connection of the armature windings $d$ and $e$. Therefore, as mentioned above, since the counter electromative voltage appearing across the armature winding $d$ is twice in magnitude and opposite in direction to that appearing across the armature winding $e$, a counter electromotive voltage of 2E is induced across the armature winding $d$ and applied through the brushes U and D to the solenoid $X_1$. In other words, a voltage $-E$ appears at the brush D, so that an electric current flows through the switch $SW_2$, the solenoid $X_1$ and the diode $D_2$ to the brush D, to thereby energize the solenoid $X_1$. By the energization of the solenoid $X_1$, the relay contact $XC_1$ is closed to establish a bypass circuit bypassing the switch $SW_2$. As a result, while the motor M is in rotation, since the voltage $-E$ appears at the brush D, the current flowing through the relay contact $XC_1$, the solenoid $X_1$ and the diode $D_2$ to the brush D and the current flowing through the relay contact $XC_1$ and the diode $D_1$ to the brush U are maintained. Consequentially, the motor M continues to rotate, even if the second switch is brought into the neutral or opened condition.

Figure 4B:
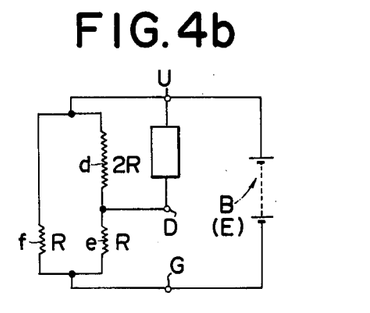
FIG. 4b is an equivalent circuit similar to FIG. 4a but when the motor is stopped.

When the window glass is completely closed, the motor M is stopped because of overload. Consequentially, the counter electromotive voltage is not induced across the winding. As a result, the windings of the armature act as pure resistors as shown in FIG. 4b. Therefore, assuming that the armature winding $f$ has a resistance R, since the armature winding $d$ has the number of turns twice that of each of the armature windings $e$ and $f$, the winding $d$ has the resistance 2R. The voltage E between the brushes U and G is divided by the resistors $d$ and $e$ and a divided voltage $\frac{2}{3}E$ appears between the brushes U and D, which is not sufficient to cause the solenoid to maintain the relay contact $XC_1$ in the closed condition. As a result, the relay contact is opened to stop the application of the voltage E to the brush U so as to deenergize the motor M.

If the second switch $SW_2$ is actuated to contact its wiper contact $l_2$ with the second stationary contact $n_2$, the voltage E is applied from the power source B to the reverse brush D of the motor M to rotate the motor in the reverse direction. As a result, the voltage 2E is induced across the armature winding $d$ in the same manner as in the forward driving of the motor as mentioned above. Namely, the voltage $-E$ appears at the brush U. Therefore, a current flows from the power source B through the switch $SW_2$, the solenoid $X_2$ and the diode $D_1$ to the brush U, to energize the solenoid $X_2$, which in turn closes the relay contact $XC_2$ to establish a current path from the power source B through the closed relay contact $XC_2$ and the diode $D_2$ to the brush D. This current path is maintained while the motor is rotating, irrespectively of whether the switch $SW_2$ is opened. When the window is fully opened, the motor is stopped because of overload, resulting in no induction of the counter electromotive force in the respective windings. Therefore, the voltage applied across the solenoid $X_2$ becomes $\frac{2}{3}E$ which cannot maintain the relay contact $XC_2$ in the closed condition. Thus, the motor M is deenergized.

Although the switches $SW_1$ and $SW_2$ have been separately in the above first embodiment, the switches $SW_1$ and $SW_2$ may be a combined switch having two operation positions as in the subsequent embodiment which will be explained in detail hereinafter.

Figure 5:
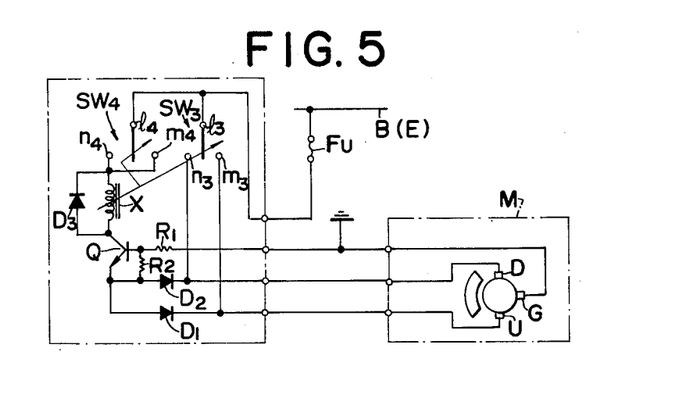
FIG. 5 is a circuit diagram of a second embodiment of the motor control means.

Now, referring to FIGS. 5 to 8, there is shown a second embodiment of the motor control means for power driven windows of this invention. FIG. 5 shows a circuit diagram of the second embodiment of the motor control means. The motor control means comprises a motor M similar to the motor used in the first embodiment shown in FIGS. 1 to 4. The motor M has the forward brush U connected to a first stationary contact $m_3$ of a first switch SW3 whose common contact $l_3$ is connected through a fuse $Fu$ to the power source B. The motor M also has the reverse brush D connected to a second stationary contact $n_3$ of the switch $SW_3$. Another switch $SW_4$ has a common contact $l_4$ connected to the common contact $l_3$ of the switch $SW_3$ and two contacts $m_4$ and $n_4$ connected together through solenoid $X_3$ to a collector of a transistor Q. A base of the transistor Q is grounded through a resistor $R_1$ and connected through a resistor $R_2$ to its emitter. The emitter of the transistor Q is connected through the respective diodes $D_1$ and $D_2$ to the brushes U and D, respectively. A diode $D_3$ is connected across the solenoid $X_3$ with its cathode connected to the contacts $m_4$ and $n_4$, so as to absorb a counter electromotive voltage occurring in the solenoid $X_3$.

Figure 6:
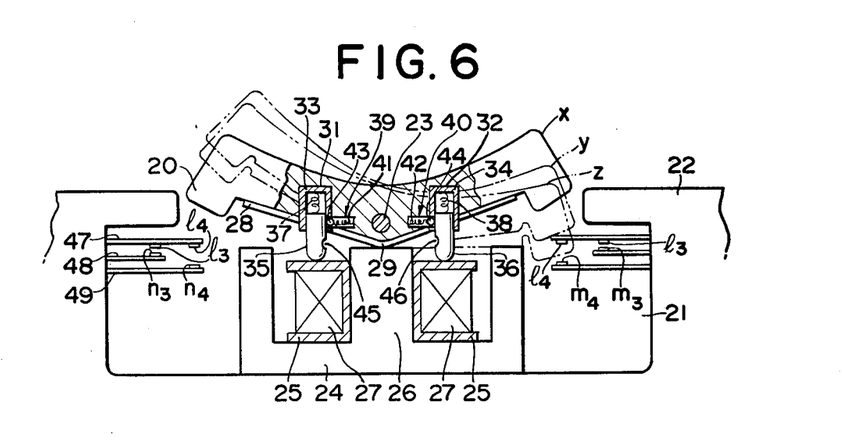
FIG. 6 is a sectional view of an operation switch used in the motor control means shown in FIG. 5.

The switches $SW_3$ and $SW_4$ and the solenoid $X_3$ may be constructed as shown in FIG. 6. In this drawing, there is provided a seesaw knob 20 of V-shaped configuration and having an upper surface formed in arc. The seesaw knob 20 is located in a cavity 21 formed in a casing 22 and pivotably mounted at its center portion on the casing 22 by a pin 23. The cavity 21 in the casing 22 has a generally rectangular sectional configuration. The solenoid $X_3$ is located within the cavity 21 below the knob 20. The solenoid $X_3$ comprises a E-shaped core 24, a bobbin 25 fitted over the center core portion 26 of the E-shaped core 24 and a winding 27 wound over the bobbin 25.

The seesaw knob 20 also has a V-shaped iron piece 28 fixed to the lower surface thereof and adapted to be contacted at its central bent portion 29 with the upper surface 30 of the center core portion 26 of the E-shaped core 24. The seesaw knob 20 is provided a pair of holes 31 and 32 formed at opposite sides of the pin 23 and apart from the pin by the same distance and each extending upwardly from the lower surface of the knob. The holes 31 and 32 respectively receive cylindrical members 33 and 34 having an upper closed end and a lower opened end. These cylindrical members 33 and 34 respectively receive pins 35 and 36 and springs 37 and 38 which bias the associated pin downwardly so as to bring the lower end of the pin into pressure engagement with the upper surface of the bobbin 25. The pair of springs 37 and 38 have substantially the same biasing force. Thus, by the action of the pins 35 and 36 and the associated springs 37 and 38, the seesaw knob 20 is maintained substantially in a horizontal position to have the same height at the opposite ends thereof as that of the outer surface of the casing 22, as shown in the solid line $x$ in FIG. 6.

The holes 31 and 32 also have inwardly extending holes 39 and 40 which accomodate therein springs 41 and 42 and balls 43 and 44, respectively. Each of the springs 41 and 42 acts to bias the associated ball 43 or 44 toward the pin 35 or 36 to cause the ball to be fitted into a recess 45 or 46 provided in the pin when the seesaw knob is rotated to a position shown by the chain line $y$ in FIG. 6. By the fitting of the ball into the recess of the pin, a large force is required for further rotating the knob 20 from the position $y$ than that required when the knob is rotated from the neutral position $x$ to the position $y$. This informs an operator that the knob has reached the position $y$ which will be called "a first operation position" hereinafter. By further rotation of the knob 20, the knob reaches the position shown by the dotted line $z$ in FIG. 6. In this position, the iron piece 28 is in contact with the upper surface of the core 24. This position $z$ will be called "a second operation position" hereinafter. As seen from FIG. 6, the knob 20 can take the first and second operation positions either in the clockwise rotation or in counterclockwise rotation.

Figure 7:
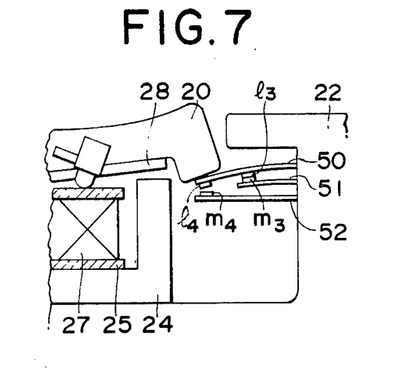
FIG. 7 is a partial sectional view of the operation switch shown in FIG. 6 in a first operation position.
Figure 8:
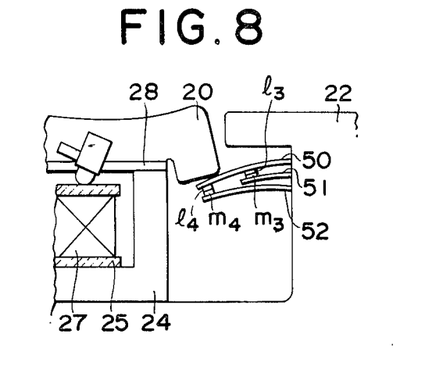
FIG. 8 is a view similar to FIG. 7, but showing the operation switch in a second operation position.

The casing 21 has a set of three leaf springs 47, 48 and 49 fixed to the left inside wall of the cavity 21 and vertically apart from one another. The casing also has another set of three leaf springs 50, 51 and 52 fixed to the right inside wall of the cavity 21 and vertically apart from one another. The upper leaf springs 47 and 50 have substantially the same length as the lower leaf springs 49 and 52. The lengths of the intermediate leaf springs 48 and 49 are shorter than that of the other leaf springs. The leaf spring 51 has the contact $m_3$ at its upper end and the leaf spring 50 has the contact $l_3$ at an intermediate lower surface corresponding to the contact $m_3$. The leaf spring 52 has the contact $m_4$ at its upper end and the leaf spring 50 also has the contact $l_4$ at its lower end corresponding to the contact $m_4$. These leaf springs 50, 51 and 52 are arranged such that when the knob 20 is rotated clockwise to the first operation position the upper leaf spring 50 is downwardly bent by the downwardly extending right end portion of the knob to bring the contact $l_3$ into engagement with the contact $m_3$ but to maintain the contact $l_4$ out of engagement with the contact $m_4$ as shown in FIG. 7 and when the knob is rotated to the second operation position, the upper leaf spring 50 is further bent by the knob to bring the contacts $l_3$ and $l_4$ into engagement with the contacts $m_3$ and $m_4$, respectively. The contacts $l_3$, $l_4$, $n_3$ and $n_4$ are provided on the leaf springs 47, 48 and 49 in the same manner as in the case of the leaf springs 50, 51 and 52.

Next, operation of the motor control means shown in FIGS. 5 to 8 will be explained. If the seesaw knob 20 is rotated clockwise to the first operation position $y$, the common contact $l_3$ is brought into engagement with the contact $m_3$, so that the voltage E is applied from the power source B to the brush U of the motor so as to rotate the motor M in the forward direction. This forward rotation of the motor will raise the window glass. At this time, if an operation force against the seesaw knob is removed, the seesaw knob will automatically return to the neutral position by the action of the spring 38, whereby the common contact $l_3$ is brought out of engagement with the contact $m_3$ to stop the motor M. As a result, the window-glass is stopped at a desired position.

If the seesaw knob 20 is rotated clockwise to the second operation position $z$, the common contacts $l_3$ and $l_4$ are brought into engagement with the contacts $m_3$ and $m_4$, respectively. The voltage E is applied from the power source B through the switch $SW_3$ to the brush U of the motor M to rotate the motor M in the forward direction. At this time, as explained with respect to the first embodiment, the voltage $-E$ is induced at the brush D because of the counter electromotive voltage appearing in the armature winding. Thus, the potential at the cathode of the diode $D_2$ becomes $-E$, so that a current flows from the ground through the resistors $R_1$ and $R_2$ and the diode $D_2$ to the brush D of the motor. As a result, the emitter potential of the transistor Q becomes $-E$ and the base of the transistor is baised in a forward direction by a voltage divided by the resistors $R_1$ and $R_2$, whereby the transistor Q is brought into an ON condition. Therefore, a current flows from the power source B through the switch $SW_4$, the solenoid $X_3$, the transistor Q and the diode $D_2$ to the brush D of the motor M so as to energize the solenoid $X_3$. Thus, the energized solenoid $X_3$ magnetically attracts the iron piece 28 of the upper surface of the core 24, to thereby hold the seesaw knob in the second operation position $z$. Consequentially, the current path from the power source B through the switch $SW_3$ to the brush U of the motor M is maintained even though the pushing force is removed from the knob. If the window-glass is completely closed in such a manner, the motor M is stopped so that the counter electromotive force is not induced in the armature winding. Therefore, the voltage between the brushes U and D becomes $\frac{2}{3}E$, and the voltage at the brush D becomes $\frac{1}{3}E$. As a result, the transistor Q is put in the reversely biased condition to turn off, whereby the solenoid $X_3$ is deenergized and the knob returns to its neutral position X. Thus, the switches $SW_3$ and $SW_4$ are opened so that the motor is deenergized.

On the one hand, if the knob 20 is rotated counterclockwise to the first operation position, the contact $l_3$ is contacted with the contact $n_3$ so that the voltage is applied from the power source B to the brush D of the motor M to rotate the motor M in the reverse direction so as to lower the window-glass. At this time, if the pushing force against the knob is removed, the motor M is stopped to stop the opening operation of the window glass.

Inversely, if the pushing force is enhanced to bring the knob into the second operation position, the common contact $l_4$ is further contacted with the contact $n_4$. The transistor Q is biased in the forward direction by the counter electromotive voltage $-E$ induced at the brush U, and as a result, the solenoid $X_3$ is energized in the same manner as in the case of the complete close operation, so as to maintain the knob in the second operation position and to keep the application of the voltage E to the brush D. Then, if the window glass is fully opened, the motor M is stopped because of overload and the counter electromotive force disappears. Consequentially, the transistor Q is put in the reversely biased condition to become OFF, so that the solenoid $X_3$ is deenergized and the knob returns from the second operation position to the neutral position to open the switches $SW_3$ and $SW_4$. Accordingly, the motor M is deenergized.

As seen from above, the motor control means for power driven window shown in FIGS. 5 to 8 can perform the full open and complete close operations of the window and the stop operation of the window at a desired position by utilizing the counter electromotive force when the window glass driving motor is rotating and with using only one solenoid.

Figure 9:
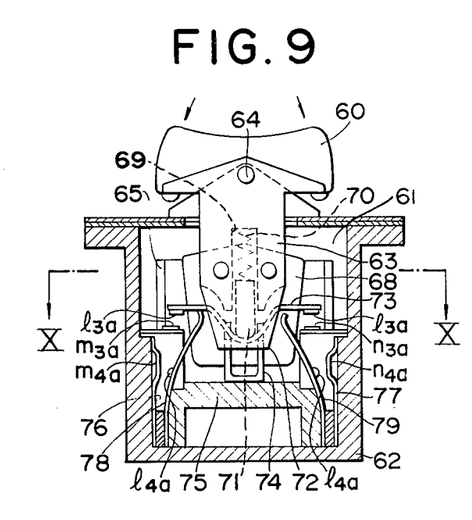
FIG. 9 is a sectional view of another operation switch.
Figure 10:
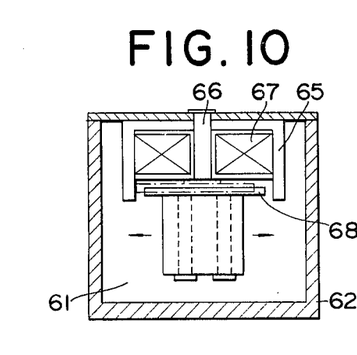
FIG. 10 is a sectional view taken along the line X—X in FIG. 9.

FIG. 9 shows another operation switch which has improved the switch shown in FIG. 6. The operation switch has a T-shaped seesaw knob 60 having an upper surface formed in arc. This seesaw knob 60 is located above a cavity 61 formed in the casing 62 with its vertical portion 63 extending downwardly within the cavity 61. The knob 60 is pivotally mounted on the casing 62 by a pin 64. Within the cavity 61, a solenoid $Xa$ is located adjacent the vertical portion 63 and mounted on the inner side wall of the casing 62 as shown in FIG. 10. The solenoid $Xa$ includes a U-shaped yoke 65, a core 66 secured to a center portion of the yoke and a coil 67 fitted over the core. The solenoid is such that when a coil is energized the solenoid $Xa$ magnetically attracts at the top surface of the core and at the inner side surface of the yoke an iron plate 68 mounted on the rear side surface of the vertical portion 63 of the knob against a biasing force which acts to return the knob to a neutral position. The iron plate 68 is mounted on the knob to allow slight rotation against the knob so that the iron plate is attracted closely to the side surface of the yoke 65.

Figure 11:
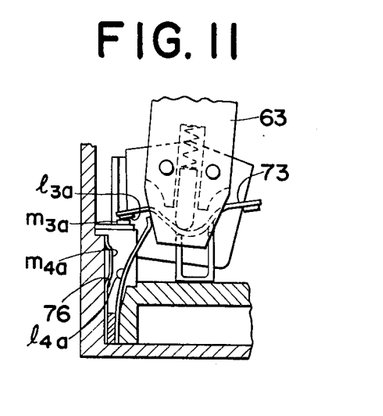
FIG. 11 is a partial sectional view of the operation switch shown in FIG. 9 in a first operation position.
Figure 12:
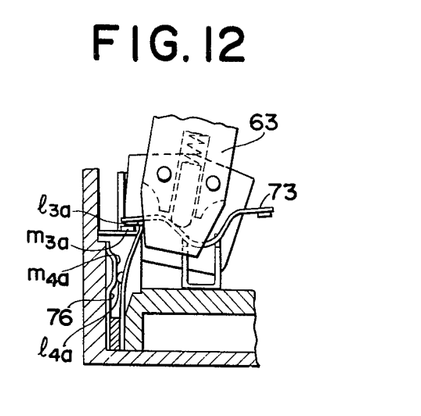
FIG. 12 is a view similar to FIG. 11, but showing the operation switch in a second operation position.
Figure 13:
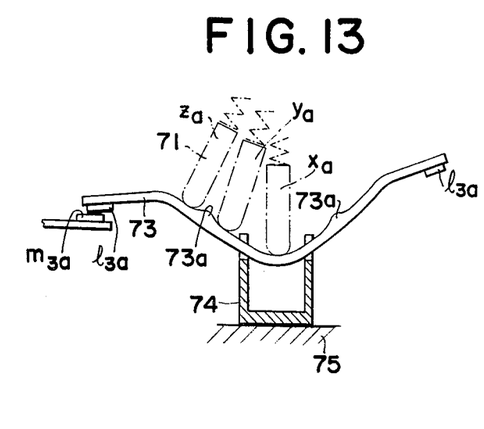
FIG. 13 is a sectional view showing the relation between the spring-biased pin and the V-shaped swinging contact member in the operation switch shown in FIG. 9.

The vertical portion 63 of the knob 60 has a hole 69 formed to extend upwardly from the lower end thereof. A pin 71 and a spring 70 for biasing the pin downwardly are inserted in the hole 69. The vertical portion 63 also has a pair of side members 72 downwardly extending at both sides of the pin 71. The pin 71 engages at its lower end with an upper surface of a V-shaped contact piece 73 interposed between the side members 72 of the knob vertical portion 63 and swingingly riding on a U-shaped support member 74 which is mounted on a support 75 fixed to the casing 62. The V-shaped contact piece 73 has a pair of contacts $l_{3a}$ provided at the opposite lower ends. The casing 62 has a pair of stationary contacts $m_{3a}$ and $n_{3a}$ provided on the opposite side walls of the casing to be engageable with the contacts $l_{3a}$ when the contact piece is brought down. The casing 62 also has a pair of stationary contact pieces 76 and 77 respectively fixed to the opposite inside walls thereof and each having a projection provided on the inner side thereof to form a contact $m_{4a}$ or $n_{4c}$. A pair of movable contact pieces 78 and 79 formed of a leaf spring are located adjacent to the stationary contact pieces 76 and 77, respectively. These movable contact pieces 78 and 79 have contacts $l_{4a}$ provided on the outside surface at the position to face to the contact of the opposed stationary contact piece. Furthermore, each of the movable pieces 78 and 79 has the upper end extending in proximity of the side surface of the knob vertical portion 63. Therefore, if the knob is rotated around the pin 64, for example, in the clockwise direction, the pin 71 is caused to walk to the left on the V-shaped contact piece 73. When the pin 71 passes the U-shaped support member 74, the V-shaped contact piece 73 is brought down to the left by the action of the spring-biased pin 71, so that the contact $l_{3a}$ is brought into contact with the contact $m_{3a}$. In this condition, the vertical portion 63 is contacted with the movable piece 78, but the contact $l_{4a}$ does not contact with the stationary contact $m_{4a}$, as shown in FIG. 11. For the purpose of informing an operator that the contact $l_{3a}$ is contacted with the contact $m_{3a}$, namely, that the pin 71 is located in the position $y_a$, a projection 73a is provided on the swinging contact piece 73 as shown in FIG. 13, so that the resistance against the operation of the knob is increased when the knob is further rotated. This condition will be called "a first operation position" hereinafter. If the knob is further rotated clockwise against the increased operation resistance, the vertical portion 63 urges the movable contact piece 78 to bring the contact $l_{4a}$ into engagement with the contact $m_{4a}$, as shown in FIG. 12, and at the same time, the pin 71 exceeds the projection 73a and reaches the position za as shown in FIG. 13. This condition will be called "a second operation position" hereinafter.

Now, operation of the above mentioned operation switch will be explained in the case that it is combined in the motor control means for power driven window shown in FIG. 5 in place of the operation switch shown in FIG. 6. If an operator wishes to raise the window glass, the knob 60 is pushed clockwise to the first operation position. In this condition, the contact $l_{3a}$ is brought into contact with the contact $m_{3a}$ so as to apply the voltage E to the knob brush U of the motor, whereby the motor is rotated in the forward direction to raise the window glass. At this time, if the pushing force is removed, the knob is automatically returned to the neutral position by cooperative action of the spring-biased pin 71 and the U-shaped swinging member 73. As a result, the motor is deenergized and the window glass is stopped at a desired position.

Inversely, if the knob is further rotated clockwise, the knob reaches the second operation position. In this condition, the contact $l_{4a}$ is brought into contact with the contact $m_{4a}$, so that the solenoid Xa is energized to magnetically attract and hold the iron plate 68, whereby the operation switch is maintained in the second operation position. Then, when the window glass is completely closed, the solenoid Xa is deenergized, so that the knob is automatically returned to the neutral position by the cooperative action of the spring-biased pin 71 and the U-shaped swinging member 73. As a result, the motor M is deenergized.

The window glass opening operation is achieved in the same manner in the case of the above-mentioned window closing operation.

As seen from the above explanation, the whole size of the operation switch as shown in FIGS. 9 to 13 becomes smaller than that of the operation switch shown in FIG. 6 because the solenoid Xa is located at the rear side of the T-shaped seesaw knob. Further, the solenoid is constructed such that the opposite ends of the yoke 65 protrude higher than the top end of the core 66 and the solenoid is adapted to magnetically attract the iron plate 68 at the side surface of the yoke 65 and at the top surface of the core. This construction provides a stronger attacting force than that in the solenoid having attacting end faces of a yoke and a core in the same flat plane. In addition, the need for high flatness on the top surfaces of the yoke and core is eliminated. Therefore, working of the solenoid yoke and core is easy.

Figure 14:
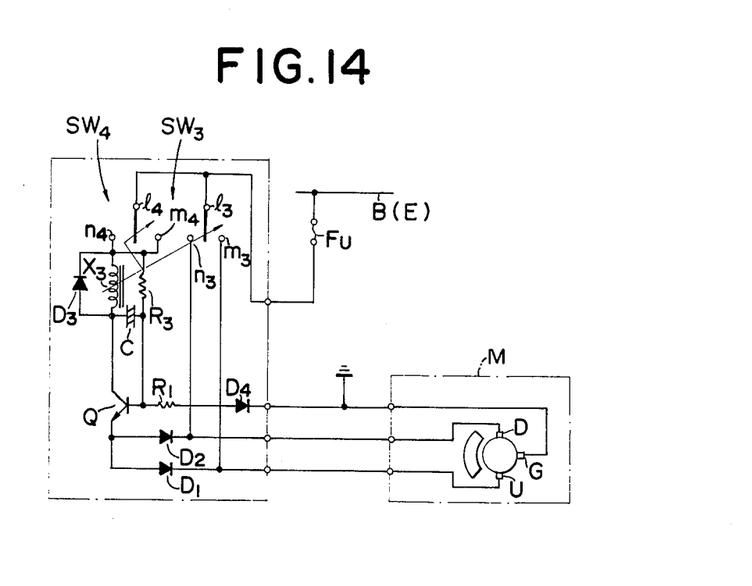
FIG. 14 is a circuit diagram of a third embodiment of the motor control means.

FIG. 14 shows a modification of the motor control circuit shown in FIG. 5. In this drawing, therefore, the same elements as those of the circuit shown in FIG. 5 are given the same reference characters. In the motor control means shown in FIG. 14, the transistor Q has a capacitor C connected between the collector and the base thereof. The biasing resistor $R_1$ is connected through a diode $D_4$ to ground. A resistor $R_3$ is connected between the switch $SW_4$ and the base of the transistor Q. But, this circuit has no resistor corresponding to the resistor $R_2$ in FIG. 5. Therefore, the resistors $R_1$ and $R_3$ act to give a biased voltage to the base of the transistor Q.

In the case that a window glass of automobiles is completely closed, the upper end of the window glass is brought into engagement with a weather strip provided on an upper edge portion of the window frame just before the window is brought into the completely closed condition. This increases the load for the motor, whereby the speed of the motor is decreased. As a result, the counter electromotive voltage induced in the armature winding becomes unstable or often lowers below a voltage sufficient for the solenoid to maintain the associated relay in the close condition. In the motor control circuits as shown in FIGS. 1 through 13, therefore, the solenoid is often deenergized to deenergize the motor M before the window is completely closed. Accordingly, it is often required to operate the operation switch again for the purpose of closing the window completely. The motor control circuit shown in FIG. 14 eliminates such inconvenience.

In the motor control circuit shown in FIG. 14, when the transistor Q is rendered conductive by induction of the counter electromotive voltage caused by rotation of the motor M, the capacitor C is charged. Thereafter, when the window approaches the completely closed condition, the load for the motor increases, and the counter electromotive voltage falls to the extent that the transistor Q almost turns off. But, at this time, the capacitor starts discharging to bias the transistor Q in the forward direction, whereby the transistor is held in the conductive condition to supply the driving voltage to the motor. As a result, the motor further continues to rotate so as to completely close the window for the period during which the capacitor is discharging. After the capacitor is completely discharged, the solenoid $X_3$ is deenergized and the switches $SW_3$ and $SW_4$ return to their neutral position to thereby deenergize the motor M. In the above manner, the complete closure of the window is attained. As seen from the above, the capacitor acts as delay means for delaying the turning-off of the transistor.

Figure 15:
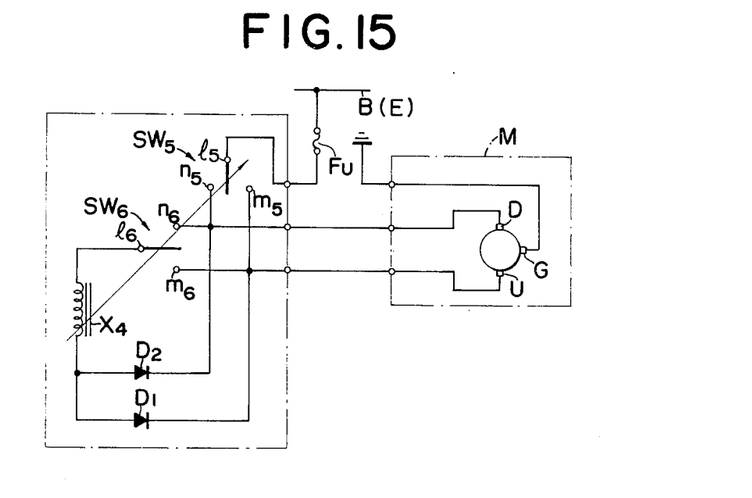
FIG. 15 is a circuit diagram of a fourth embodiment of the motor control means.

Now, referring to FIG. 15, there is shown a circuit diagram of a simplified motor control means for power driven windows in which no transistor is used and in which a solenoid for holding the associated switches is energized directly by counter electromotive current induced in a window driving motor. In this circuit, the same motor M as that used in the first embodiment shown in FIGS. 1 through 4 may be used. The motor M has the forward direction brush U connected to a first stationary contact $m_5$ of a switch $SW_5$ whose common contact $l_5$ is connected through a fuse Fu to the power source B. The motor M also has the reverse direction brush D connected to a second stationary contact $n_5$ of the switch $SW_5$ and the grounded brush G. The first and second stationary contacts $m_5$ and $n_5$ of the switch $SW_5$ are connected respectively to first and second stationary contacts $m_6$ and $n_6$ of a second switch $SW_6$ whose common contact is connected to one end of a solenoid $X_4$. The other end of the solenoid $X_4$ is connected to the brushes U and D, respectively, through diodes $D_1$ and $D_2$, respectively. The switches $SW_5$ and $SW_6$ are adapted to automatically take their neutral position as shown in FIG. 15 when an external operation force is not applied. Further, the switches $SW_5$ and $SW_6$ and the solenoid $X_4$ are adapted such that when the solenoid is energized, the solenoid holds the switches $SW_5$ and $SW_6$ in the condition in which they were at the moment the solenoid is energized. Therefore, the operation switch as shown in FIG. 9 can be used for the switches $SW_5$ and $SW_6$ and the solenoid $X_4$.

Next, operation will be explained. If the switch $SW_5$ is actuated to bring the contact $l_5$ into contact with the contact $m_5$, the voltage E from the power source B is applied through the fuse Fu and the switch $SW_5$ to the forward brush U of the motor so as to rotate the motor in the forward direction. Consequentially, the window glass is driven upwardly. At this time, if operating force is removed from the switch $SW_5$, the switch automatically returns to the neutral position to break the driving current to the motor. As a result, the window glass is stopped at a desired position.

Inversely, in addition to the actuation of the switch $SW_5$, if the switch $SW_6$ is actuated to render the contact $l_6$ into contact with the contact $m_6$, the counter electromotive voltage 2E appearing between the brushes U and D by the rotation of the motor is applied across the solenoid $X_4$. Specifically, +E is applied to the one end of the solenoid connected to the switch $SW_6$, and on the other hand, the counter electromotive voltage −E induced at the brush D is applied to the other end of the solenoid $X_4$ through the diode $D_2$. As a result, the solenoid is energized to hold the switches $SW_5$ and $SW_6$ in the closed condition. This condition is maintained to drive the window glass upwardly until the window is completely closed. Then, the motor is stopped because of overload, resulting in no induction of the counter electromotive voltage. Thus, the voltage appearing between the brushes U and D becomes $\frac{2}{3}E$, which is insufficient for the solenoid to hold the switches in the closed condition. Consequentially, the switches return to their neutral position and the motor is deenergized.

Operation for opening the window will be performed in a manner similar to that in the case of the window closing operation except that the contacts $l_5$ and $l_6$ are brought into contact with the stationary contacts $n_5$ and $n_6$, respectively.

As seen from the above illustrated and described embodiments, according to this invention, since the switch for maintaining the supply of the driving current to the motor is held in the closed condition by the solenoid which is energized by utilizing the counter electromotive force induced in the motor in rotation, the switch automatically opens to deenergize the motor at the stop of the motor caused by the full open or the complete closing of the window. Therefore, no separate circuit or means for detecting the stop of the motor is required. Thus, the motor control circuit is simpler and more reliable than the conventional circuits. In addition, this invention is advantageous in that it is applicable to the conventional motor circuit for power driven window without substantial modification.

It should be understood that various changes and modifications may be made without departing from the scope and spirit of this invention.

I claim:

1. Motor control means for power driven window comprising reversible D.C. motor means adapted to be connected to a D.C. power source for driving window glass, said motor means having first and second brush means and third brush means connected to ground; an operation switch device having first switch means for selectively connecting the D.C. power source to one of said first and second brush means of said motor means and a second switch means for completing a current path between the D.C. power source and one of said first and second brush means and bypassing said first switch means, said first switch means being adapted to be closed when said switch device is moved to a first operation position and when said switch device is moved to a second operation position and said second switch means being adapted to be closed only when said switch device is moved to the second operation position; and solenoid means adapted to be energized by a counter electromotive voltage induced between said first and second brush means of said motor means during rotation of said motor means for holding said first and second switch means in the condition in which they were at the moment the solenoid is energized, said first switch means being connected between said power source and said motor, and said second switch means being connected to complete, when closed, an energizing circuit for said solenoid means by the counter electromotive voltage, whereby said first and second switch means are maintained in the second operation condition and whereby, when said motor is stopped said solenoid is deenergized to allow said first and second switch means to return to an open condition to thereby deenergize said motor means.

2. Motor control means as set forth in claim 1 wherein said operation switch device includes an operation knob having a magnetic material mounted thereon, said solenoid means being adapted to attract said magnetic material.

3. Motor control means as set forth in claim 2 wherein said solenoid means comprises a U-shaped yoke, a central core fixed to said yoke and a coil wound over said core, and wherein when said solenoid means is energized, said magnetic material mounted on said operation knob is attracted to the inside surface of said yoke and the top surface of said core.

4. Motor control means as set forth in claim 1 wherein said solenoid means is energized directly by the counter electromotive voltage.

5. Motor control means as set forth in claim 1 further including transistor switching circuit connected to said solenoid means and to said motor and adapted to be turned on by the counter electromotive voltage, so as to energize said solenoid means.

6. Motor control means as set forth in claim 5 wherein said transistor switching circuit has a delay means for delaying the turning-off of the transistor when the counter electromotive voltage lowers or disappears.

* * * * *